(12) United States Patent
Koyama

(10) Patent No.: US 9,469,188 B2
(45) Date of Patent: Oct. 18, 2016

(54) WORK VEHICLE

(71) Applicant: KOMATSU LTD., Tokyo (JP)

(72) Inventor: Natsuhiko Koyama, Komatsu (JP)

(73) Assignee: KOMATSU LTD., Tokyo (JP)

( * ) Notice: Subject to any disclaimer, the term of this patent is extended or adjusted under 35 U.S.C. 154(b) by 472 days.

(21) Appl. No.: 14/344,093

(22) PCT Filed: Nov. 13, 2013

(86) PCT No.: PCT/JP2013/080641
§ 371 (c)(1),
(2) Date: Mar. 11, 2014

(87) PCT Pub. No.: WO2014/181488
PCT Pub. Date: Nov. 13, 2014

(65) Prior Publication Data
US 2016/0250918 A1 Sep. 1, 2016

(51) Int. Cl.
| | |
|---|---|
| *B60K 13/02* | (2006.01) |
| *E02F 9/08* | (2006.01) |
| *F02M 35/024* | (2006.01) |
| *F02M 35/10* | (2006.01) |
| *E02F 3/34* | (2006.01) |

(52) U.S. Cl.
CPC ............ *B60K 13/02* (2013.01); *E02F 9/0866* (2013.01); *F02M 35/024* (2013.01); *F02M 35/10137* (2013.01); *F02M 35/10144* (2013.01); *B60Y 2200/415* (2013.01); *E02F 3/34* (2013.01)

(58) Field of Classification Search
CPC ........... B60K 13/02; F02M 35/10137; F02M 35/10144; F02M 35/024; E02F 9/0866
See application file for complete search history.

(56) References Cited

U.S. PATENT DOCUMENTS

2009/0229685 A1* 9/2009 Hageman ............... B60K 13/02
137/544

FOREIGN PATENT DOCUMENTS

| JP | 5-12370 A | 1/1993 |
|---|---|---|
| JP | 9-88121 A | 3/1997 |
| JP | 2003-254183 A | 9/2003 |
| JP | 2006-28873 A | 2/2006 |

OTHER PUBLICATIONS

The International Search Report for the corresponding international application No. PCT/JP2013/080641, issued on Jan. 28, 2014.

* cited by examiner

*Primary Examiner* — John Walters
*Assistant Examiner* — James Triggs
(74) *Attorney, Agent, or Firm* — Global IP Couselors, LLP

(57) ABSTRACT

A wheel loader includes an upper plate, a hose member, an air intake pipe, a supporting member, a first lid member, and a first fastening member. The hose member extends upwardly through a first opening part formed in the upper plate. The air intake pipe is removably coupled to an upper end part of the hose member. A horizontal part of the supporting member extends horizontally from the side part and is fixed to a side surface of the air intake pipe. A first body part of the first lid member covers a second opening part in a side part of the supporting member. A second attachment part of the first lid member extends horizontally from the first body part to be disposed on the horizontal part. The first fastening member attaches the first lid member to the supporting member by fastening the second attachment part and the horizontal part.

18 Claims, 5 Drawing Sheets

WORK VEHICLE

CROSS-REFERENCE TO RELATED APPLICATIONS

This application is a U.S. National stage application of International Application No. PCT/JP2013/080641, filed on Nov. 13, 2013.

BACKGROUND

1. Field of the Invention

The present invention relates to a work vehicle.

2. Background Information

A work vehicle has an air cleaner for cleaning air to be supplied to the engine. For example, a wheel loader, which is an example of a work vehicle, is illustrated in FIGS. 6 and 7 in Japanese Laid-Open Patent Publication No. H9-88121 and is provided with an air cleaner disposed inside the engine room. An air intake pipe extends upwardly from the air cleaner.

SUMMARY

Due to the amount of space in the engine room, the air cleaner is installed in the engine room in a state in which an air intake port of the air cleaner faces horizontally instead of vertically even though the air intake pipe extends upwardly. In this case, the air intake port of the air cleaner and the air intake pipe need to be coupled by a flexible hose member. Moreover, a supporting member for supporting the air intake pipe needs to be provided. However, there is a problem in that work to couple the air intake pipe and the hose member is complex when the supporting member is provided.

An object of the present invention is to allow work for coupling the air intake pipe and the hose member to be performed easily.

A work vehicle according to an aspect of the present invention is provided with an upper plate, an air cleaner, a hose member, an air intake pipe, a supporting member, a first lid member, and a first fastening member. The upper plate defines an upper surface of an engine room. The upper plate has a first opening part. The air cleaner is disposed in the engine room. The hose member is coupled to the air cleaner. The hose member extends upwardly from the engine room via the first opening part. The air intake pipe is removably coupled to an upper end part of the hose member. The supporting member has a first attachment part, a side part, and a horizontal part. The first attachment part is removably attached to the upper plate and surrounds the first opening part as seen in a plan view. The side part extends upwardly from the first attachment part and includes a second opening part. The horizontal part extends horizontally from the side part and is fixed to a side surface of the air intake pipe. The first lid member has a first body part and a second attachment part. The first body part covers the second opening part. The second attachment part extends horizontally from the first body part and is disposed on the horizontal part. The first fastening member attaches the first lid member to the supporting member due to the second attachment part being fastened to the horizontal part.

According to this configuration, because the side part of the supporting member has the second opening part, work for coupling the air intake pipe and the hose member may be performed via the second opening part. Because the second opening part is covered by the first body part of the first lid member, the intrusion of rainwater into the supporting member via the second opening part may be prevented.

The first fastening member fastens the horizontal part that extends horizontally to the second attachment part that extends horizontally. Specifically, because the first fastening member is disposed to extend in a perpendicular direction, the surface area occupied by the first fastening member in the second opening part may be reduced. As a result, the surface area of the second opening part that is used when performing the above coupling work may be increased.

Preferably, the work vehicle is further equipped with a first water stop sheet. The first water stop sheet is disposed between an edge part of the second opening part and the first body part. According to this configuration, the intrusion of rainwater from a gap between the first body part and the side part may be prevented.

Preferably, the first water stop sheet is compressed by the edge part of the second opening part and the first body part in a state in which the first lid member is attached to the supporting member. According to this configuration, the intrusion of rainwater from a gap between the first body part and the side part may be reliably prevented.

Preferably, the work vehicle is further equipped with a second water stop sheet. The second water stop sheet is disposed between the first lid member and the first attachment part. According to this configuration, the intrusion of rainwater from a gap between the first lid member and the first attachment part may be prevented.

Preferably, the second water stop sheet is compressed by the first lid member and the first attachment part in a state in which the first lid member is attached to the supporting member. According to this configuration, the intrusion of rainwater from a gap between the first lid member and the first attachment part may be reliably prevented.

Preferably, the first lid member further includes a first pressing part that extends horizontally from a lower end part of the first body part. The second water stop sheet is disposed between the pressing part and the first attachment part. According to this configuration, the second water stop sheet is safely compressed by the first pressing part.

Preferably, the side part has a first side plate and a second side plate disposed with a certain gap therebetween. The first opening part is located between the first side plate and the second side plate as seen in a plan view. The second opening part is formed by the gap between the first side plate and the second side plate.

Preferably, the side part further has a third opening part that is located facing the second opening part. According to this configuration, the above coupling work may be performed more efficiently by using the third opening part in addition to the second opening part.

Preferably, the work vehicle is further equipped with a second lid member and a second fastening member. The second lid member has a second body part and a third attachment part. The second body part covers the third opening part. The third attachment part extends horizontally from the second body part and is disposed on the horizontal part. The second fastening member attaches the second lid member to the supporting member due to the third attachment part being fastened to the horizontal part. According to this configuration, the intrusion of rainwater from the third opening part may be prevented. The second fastening member fastens the horizontal part to the third attachment part. Specifically, since the second fastening member is disposed so as to extend in a perpendicular direction, the surface area occupied by the second fastening member in the third opening part may be reduced. As a result, the surface area of the third opening part that is used when performing the above coupling work may be increased.

Preferably, the second attachment part and the horizontal part each have through-holes. The first fastening member is configured with bolts and nuts, and the bolts extend through the through-holes to engage with the nuts fixed to the lower surface of the horizontal part.

Preferably, the air cleaner is suspended from the upper plate.

Preferably, the air cleaner has an air intake part facing horizontally, and the hose member is coupled to the air intake part.

Preferably, the work vehicle is further provided with a band member for fastening, from an outer circumferential side, an upper end part of the hose member disposed on the outer circumferential side of an air intake pipe. According to this configuration, the air intake pipe and the hose member may be coupled by the band member.

Preferably, the air intake pipe has a lower pipe part and an upper pipe part. The lower pipe part is coupled to the upper end part of the hose member. The upper pipe part has a diameter greater than that of the lower pipe part and communicates with the lower pipe part. The horizontal part has a fourth opening part. The inner circumferential surface of the fourth opening part is connected to the outer circumferential surface of the lower pipe part. The upper pipe part extends upward from the horizontal part.

According to the present invention, in addition to being able to easily perform the work of coupling the air intake pipe and the hose member, the intrusion of rainwater into the engine room may also be prevented.

DETAILED DESCRIPTION OF EXEMPLARY EMBODIMENTS

Figure 1:
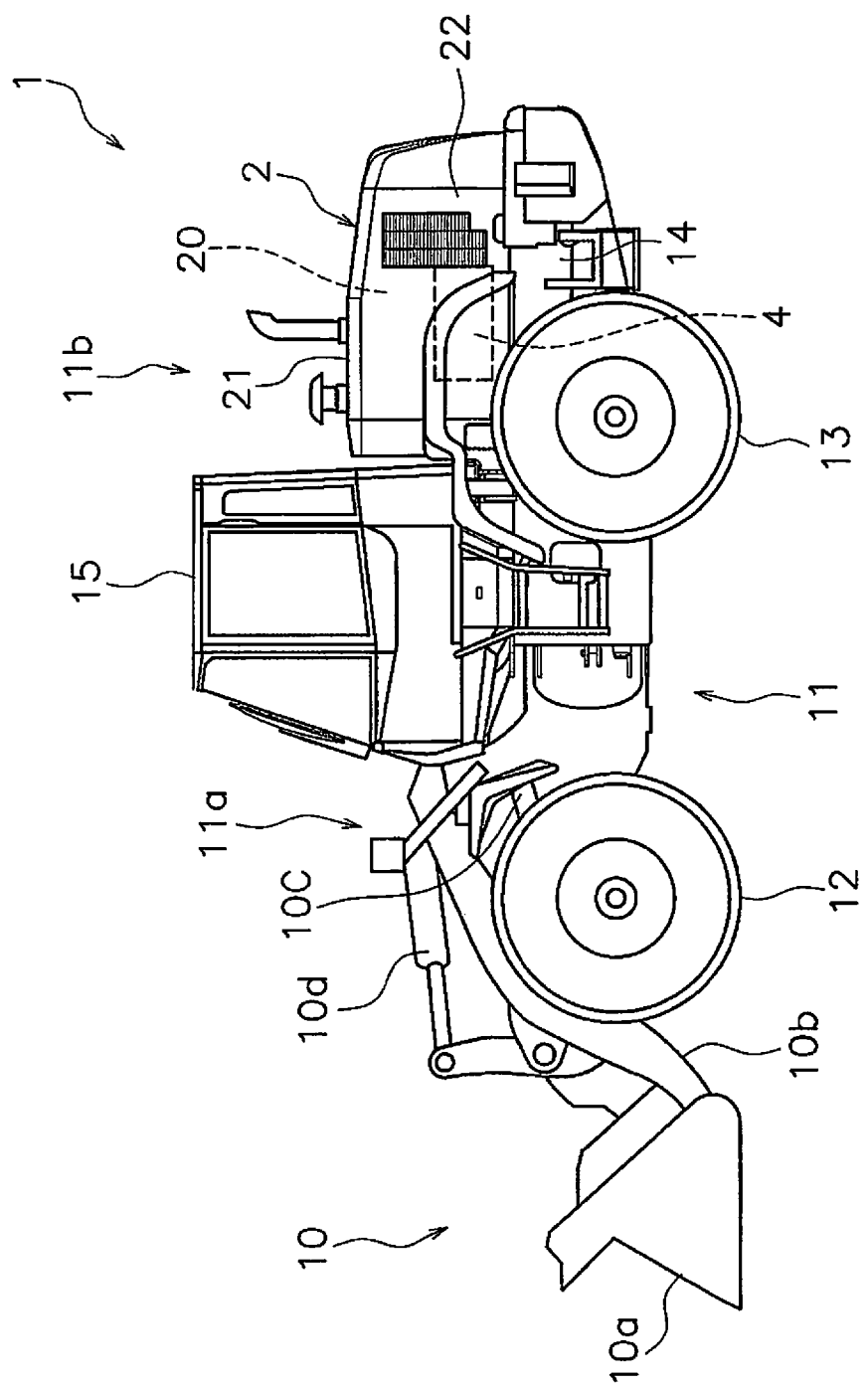
FIG. 1 is a side elevational view of a wheel loader.

An embodiment of a wheel loader, which is an example of a work vehicle according to an exemplary embodiment of the present invention, is described below with reference to the drawings. FIG. 1 is a side elevational view of a wheel loader as seen from the left side. In the following explanation, "front" and "rear" refer to the front and the rear of a vehicle body 11. That is, the left side is the "front" and the right side is the "rear" in FIG. 1. In the following explanation, "right," "left," "up," and "down" indicate directions relative to a state of looking forward from the operating cabin, and "vehicle width direction" and "crosswise direction" have the same meaning. Moreover, the front-back direction signifies the front-back direction of the vehicle body. In the following explanation, "horizontal" includes not only a purely horizontal state, but also includes a substantially horizontal state.

As illustrated in FIG. 1, a wheel loader 1 includes a work implement 10, the vehicle body 11, front wheels 12, and rear wheels 13. The wheel loader 1 is capable of traveling due to the rotation of the front wheels 12 and the rear wheels 13, and desired work can be conducted using the work implement 10.

The work implement 10 is a mechanism driven by operating fluid pressurized by a hydraulic pump (not illustrated), and is disposed at the front of the vehicle body 11. The work implement 10 includes a bucket 10a, a boom 10b, a lift cylinder 10c, and a bucket cylinder 10d. The bucket 10a is attached to the tip of the boom 10b. The boom 10b is a member for lifting the bucket 10a and is mounted at the front part of a below mentioned front vehicle section 11a. The lift cylinder 10c drives the boom 10b with pressure oil discharged from the hydraulic pump. The bucket cylinder 10d drives the bucket 10a with pressure oil discharged from the hydraulic pump.

The vehicle body 11 includes the front vehicle section 11a and a rear vehicle section 11b. The front vehicle section 11a and the rear vehicle section 11b are coupled to each other in a manner that allows swinging in the crosswise direction. The work implement 10 and the front wheels 12 are provided on the front vehicle section 11a, and the rear wheels 13 are provided on the rear vehicle section 11b.

The rear vehicle section 11b includes a rear frame 14, a cab 15, and a vehicle body cover 2. The rear frame 14 supports the rear wheels 13, the cab 15, and the vehicle body cover 2. The cab 15 is disposed in the front part of the rear vehicle section 11b. An operating cabin is provided inside the cab 15, and various operating members and an operating panel are provided inside the cab 15.

Figure 2:
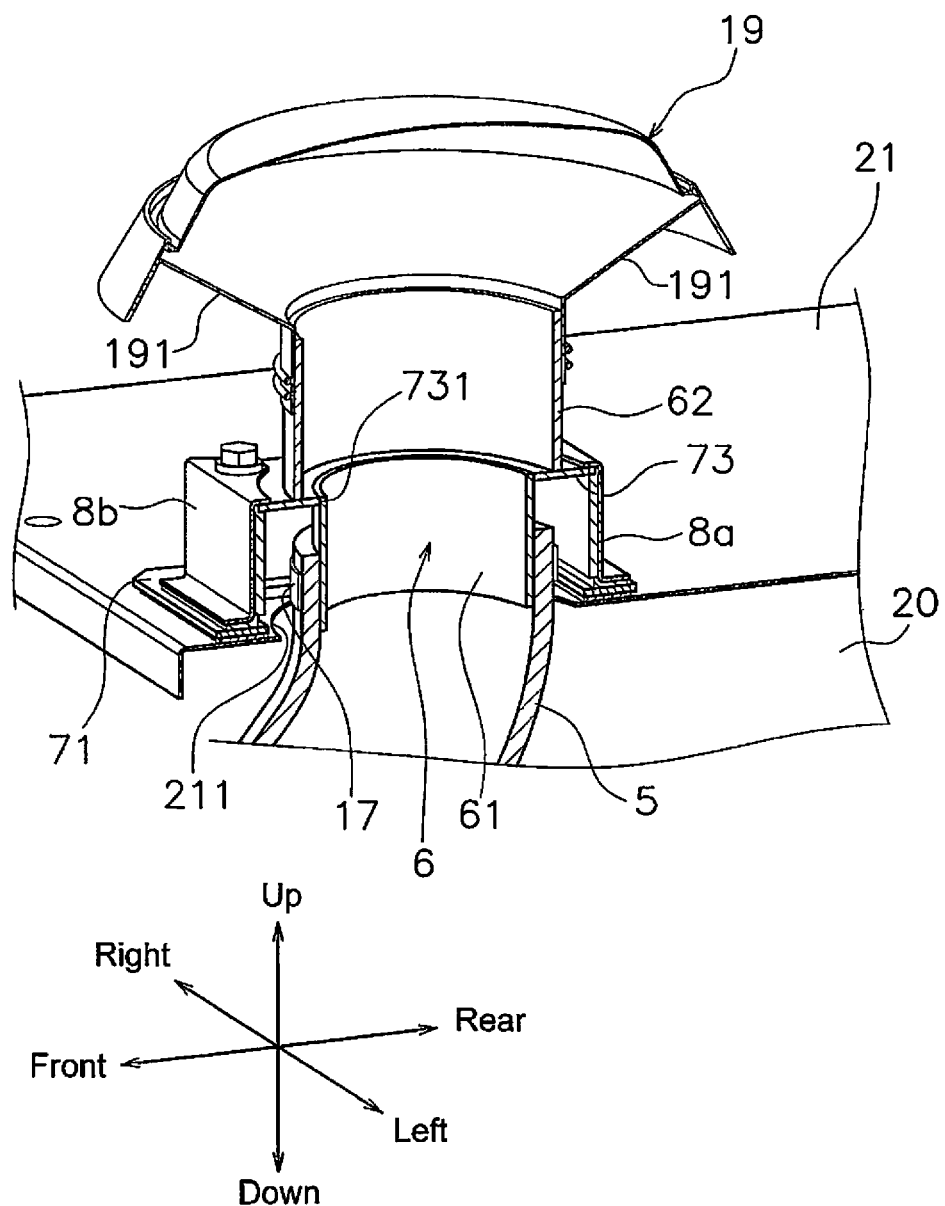
FIG. 2 is a perspective view in partial cross-section illustrating the vicinity of an air intake pipe.

The vehicle body cover 2 defines an engine room 20, and an air cleaner 3 (see FIG. 3) and an engine 4 are disposed inside the engine room 20. The vehicle body cover 2 includes an upper plate 21 and a pair of side plates 22. The upper plate 21 is a plate-like member that defines the upper surface of the engine room 20, and the pair of side plates 22 are plate-like members that define both side surfaces of the engine room 20. As illustrated in FIG. 2, a circular first opening part 211 is formed in the front part of the upper plate 21. FIG. 2 is a cross-section perspective view illustrating the vicinity of an air intake pipe 6 as seen from the left front side.

Figure 3:
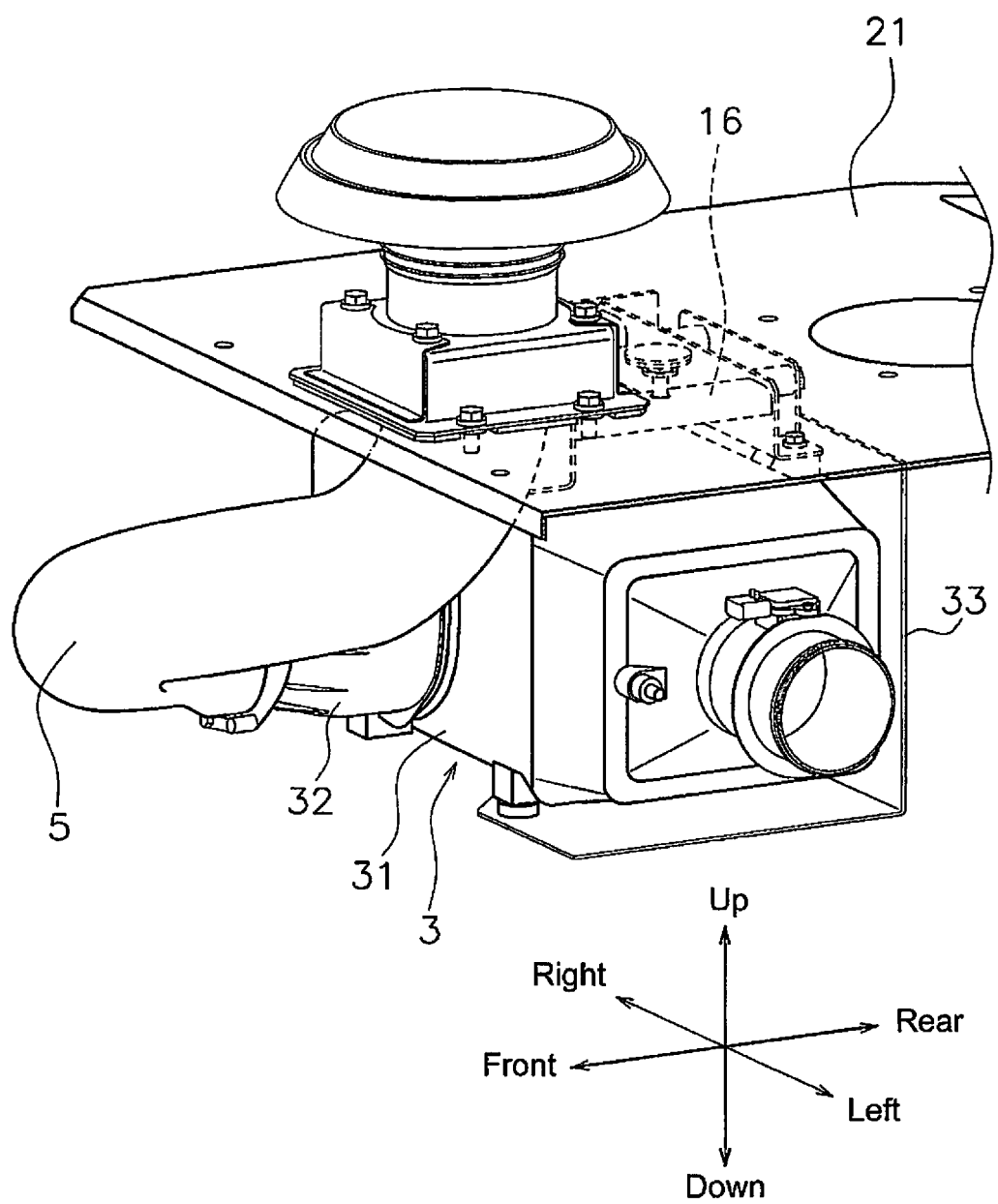
FIG. 3 is a perspective view illustrating the vicinity of the air intake pipe.

FIG. 3 is a perspective view illustrating the vicinity of the air intake pipe 6 as seen from the left front side. Only the upper plate 21 of the vehicle body cover 2 is illustrated to allow the appearance inside the engine room 20 to be seen. As illustrated in FIG. 3, the air cleaner 3 is disposed inside the engine room 20. The air cleaner 3 is attached to be suspended from the upper plate 21 by a mounting bracket 16. Moreover, a heat shield plate 33 is provided to cover the bottom surface and the rear surface of the air cleaner 3. A rise in the temperature of the air cleaner 3 due to heat from a heat source (e.g., the engine 4) installed inside the engine room 20 may be prevented by the heat shield plate 33.

The air cleaner 3 has an air cleaner body 31 and an air intake part 32. The air cleaner body 31 is disposed inside the engine room 20 and cleans air to be supplied to the engine 4. More specifically, the air cleaner body 31 has a filter (not shown) thereinside and air sucked inside via the air intake part 32 is filtered and then supplied to the engine 4.

The air intake part 32 opens in the horizontal direction. That is, the air intake part 32 extends horizontally from the air cleaner body 31. Specifically, the air intake part 32 extends toward the front from the air cleaner body 31. The inside of the air intake part 32 and the inside of the air cleaner body 31 are in communication. The air intake part 32 is formed in a truncated cone shape so that the diameter correspondingly decreases nearer the distal end.

A hose member 5 is coupled to the distal end part of the air intake part 32. As illustrated in FIG. 2, the hose member 5 is flexible and extends upwardly via the first opening part 211 in the upper plate 21. A distal end part of the hose member 5, that is, an upper end part of the hose member 5, is located above the upper plate 21. The hose member 5 is disposed so that a gap is opened between the hose member 5 and the first opening part 211.

The air intake pipe 6 is removably coupled to the upper end part of the hose member 5. Specifically, the air intake pipe 6 includes a lower pipe part 61 and a below mentioned upper pipe part 62. The lower pipe part 61 is formed in a cylindrical shape and a lower part of the lower pipe part 61 is attached to the upper end part of the hose member 5. Specifically, the lower part of the lower pipe part 61 is inserted inside the upper end part of the hose member 5. As a result, the inner circumferential surface of the upper end part of the hose member 5 forms a sealed state with the outer circumferential surface of the lower part of the air intake pipe 5. In this state, the hose member 5 and the lower pipe part 61 are reliably coupled due to a band member 17 that fastens the upper end part of the hose member 5 from the outer circumferential side. The lower pipe part 61 may be removed from the hose member 5 by removing the band member 17. A below mentioned supporting member 7 is fixed to the lower pipe part 61.

Figure 4:
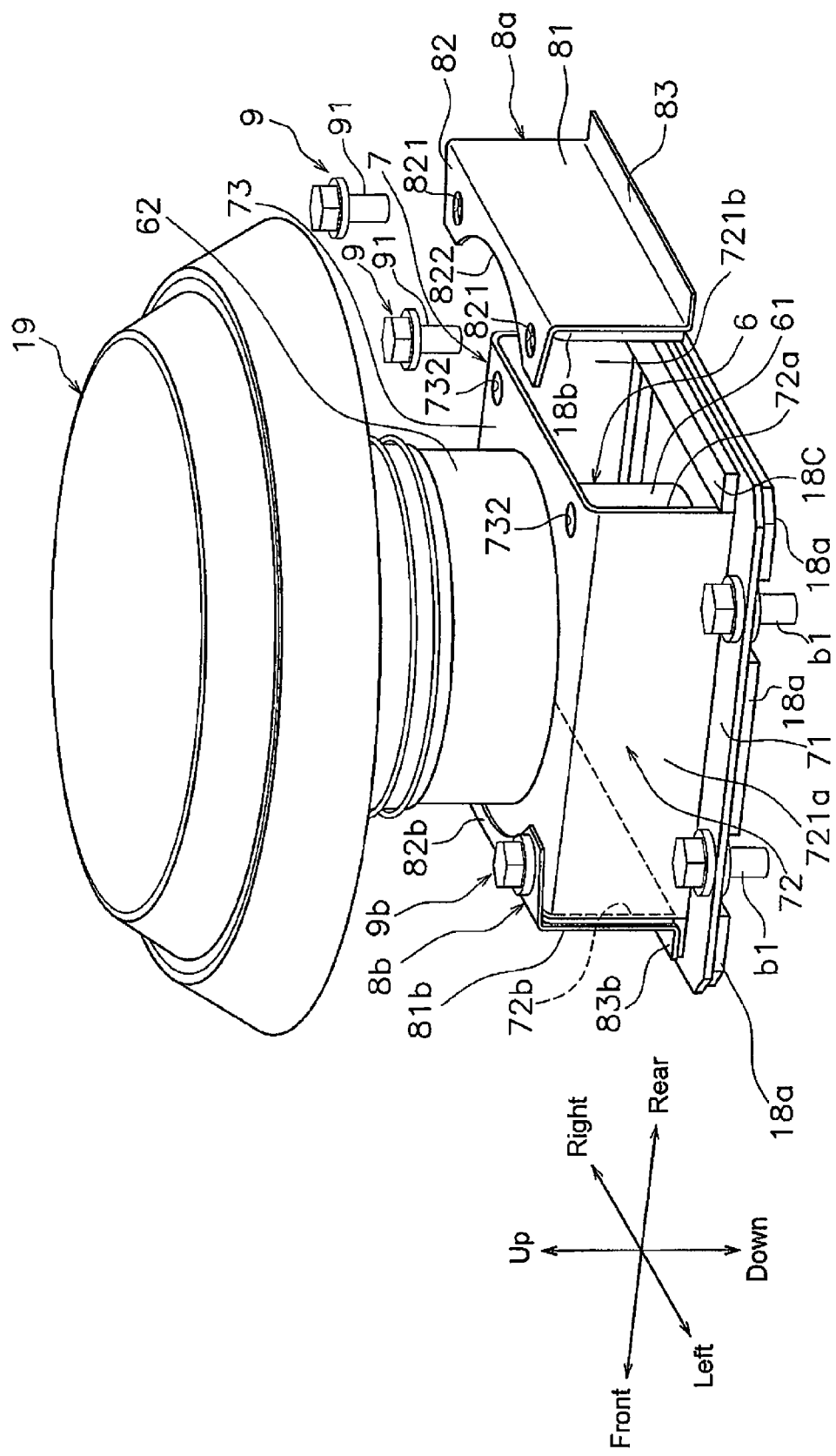
FIG. 4 is a perspective view illustrating the vicinity of the air intake pipe.

FIG. 4 is a perspective view illustrating the vicinity of the air intake pipe 6 as seen from the left rear side. FIG. 4 depicts a state in which a first lid member 8a is removed. The supporting member 7 is a member for supporting the air intake pipe 6. As illustrated in FIG. 4, the supporting member 7 includes a first attachment part 71, a side part 72, and a horizontal part 73. As illustrated in FIG. 2, the first attachment part 71 is removably attached to the upper plate 21 to surround the first opening part 211 as seen in a plan view. Specifically, the first attachment part 71 has a rectangular frame shape and is fixed to the upper plate 21 with a plurality of bolts b1. As seen in a plan view, the first opening part 211 is disposed within the frame of the first attachment part 71.

As illustrated in FIG. 4, a plurality of third water stop sheets 18a are attached to the lower surface of the first attachment part 71. Specifically, the third water stop sheets 18a are attached to the lower surface of the first attachment part 71 by double-sided adhesive tape and the like. The third water stop sheets 18a are compressed by the first attachment part 71 and the upper plate 21 in a state in which the first attachment part 71 is attached to the upper plate 21. The third water stop sheets 18a preferably have elasticity. The third water stop sheets 18a preferably have a property of swelling due to the absorption of water. For example, urethane foam sheets may be used for the third water stop sheets 18a.

The side part 72 extends upward from the first attachment part 71 and includes a second opening part 72a and a third opening part 72b. Specifically, the side part 72 has a first side plate 721a and a second side plate 721b. The first side plate 721a and the second side plate 721b are disposed with a gap provided therebetween. Specifically, the first side plate 721a and the second side plate 721b extend upward from the first attachment part 71. The first side plate 721a extends upward from a first opening edge part of the first attachment part 71. The second side plate 721b extends upward from a second opening edge part that faces the first opening edge part of the first attachment part 71.

Specifically, the first attachment part 71 has a rectangular opening throughout. The first opening edge part is an opening edge part located on the left side and the second opening edge part is an opening edge part located on the right side of the rectangular opening. In other words, the first side plate 721a and the second side plate 721b extend in the front-back direction, and the first side plate 721a and the second side plate 721b are disposed with a gap therebetween in the vehicle width direction. The first side plate 721a and the second side plate 721b are fixed by welding and the like to the first attachment part 71.

The first opening part 211 is located between the first side plate 721a and the second side plate 721b as seen in a plan view. The second opening part 72a and the third opening part 72b are formed by the gap between the first side plate 721a and the second side plate 721b. Specifically, the second opening part 72a is defined by the rear edge of the first side plate 721a and the rear edge of the second side plate 721b. That is, the second opening part 72a is formed over the entire rear end surface of the supporting member 7. The third opening part 72b is defined by the front edge of the first side plate 721a and the front edge of the second side plate 721b. That is, the third opening part 72b is formed over the entire front end surface of the supporting member 7. The second opening part 72a and the third opening part 72b are formed in positions facing each other in the front-back direction.

The horizontal part 73 extends horizontally from the side part 72. The horizontal part 73 is formed as a rectangular sheet and couples the upper edge of the first side plate 721a and the upper edge of the second side plate 721b. The first side plate 721a, the second side plate 721b, and the horizontal part 73 are formed from one plate-like member that is folded.

As illustrated in FIG. 2, the horizontal part 73 is fixed to the side surface of the air intake pipe 6. Specifically, the horizontal part 73 is fixed to the side surface of the lower pipe part 61 of the air intake pipe 6. For example, the horizontal part 73 may be fixed to the air intake pipe 6 by welding and the like. The horizontal part 73 has a circular fourth opening part 731 in the middle part. The inner circumferential surface of the fourth opening part 731 is fixed to the outer circumferential surface of the upper end part of the lower pipe part 61. Specifically, the inner circumferential surface of the fourth opening part 731 is fixed by welding and the like to the outer circumferential surface of the upper end part of the lower pipe part 61. As a result, the supporting member 7 and the lower pipe part 61 are fixed to each other.

As illustrated in FIG. 4, the first lid member 8a is a member for covering the second opening part 72a of the side part 72. The first lid member 8a includes a first body part 81, a second attachment part 82, and a first pressing part 83. The first body part 81, the second attachment part 82, and the first pressing part 83 are formed from one plate-like member that is folded.

The first body part 81 covers the second opening part 72a. Specifically, the first body part 81 is formed in a rectangular shape and is designed with dimensions that allow the entire second opening part 72 to be covered. A first water stop sheet 18b is attached to the back surface (surface facing the second opening part 72a) of the first body part 81. The first water stop sheet 18b has a rectangular shape and is designed with dimensions that allow the entire second opening part 72a to be covered.

The first water stop sheet 18b is compressed by the edge of the second opening part 72a and the first body part 81 when the first lid member 8a is attached to the supporting member 7. The edge of the second opening part 72a is formed by the rear end surface of the first side plate 721a, the rear end surface of the second side plate 721b, and the rear end surface of the horizontal part 73. The first water stop sheet 18b is preferably designed with a thickness to enable the abovementioned compression in consideration of dimensional tolerances of below mentioned through-holes 732 and 821 and the like. The first water stop sheet 18b may be made of the same material as the above-mentioned third water stop sheet 18a.

The second attachment part 82 is a portion that extends horizontally from an upper end part of the first body part 81. The second attachment part 82 is disposed on the horizontal part 73 when the first lid member 8a is attached to the supporting member 7. That is, the second attachment part 82 extends horizontally from the upper end part of the first body part 81 toward the air intake pipe 6. As seen in a plan view, the second attachment part 82 is formed in a rectangular shape and has formed therein a notch 822 that follows the shape of the upper pipe part 62.

The first pressing part 83 is a portion that extends horizontally from a bottom end part of the first body part 81. The first pressing part 83 extends in the direction opposite the direction in which the second attachment part 82 extends. The first pressing part 83 compresses a second water stop sheet 18c attached on the first attachment part 71 when the first lid member 8a is attached to the supporting member 7. The second water stop sheet 18c is compressed due to being pressed by the first pressing part 83. The second water stop sheet 18c may be made of the same material as the above-mentioned third water stop sheet 18a. The second water stop sheet 18c is a member for preventing rainwater from intruding between the first lid member 8a and the first attachment part 71 toward the second opening part 72a. As a result, the second water stop sheet 18c extends from the first side plate 721a to the second side plate 721b along the lower edge of the second opening part 72a.

Figure 5:
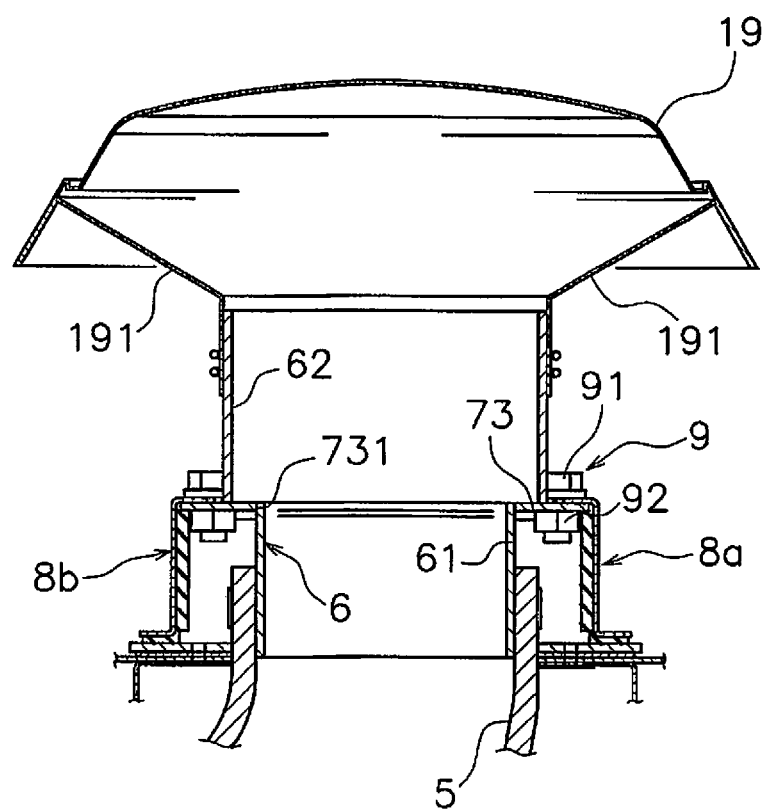
FIG. 5 is a side elevational view in cross-section illustrating the vicinity of the air intake pipe.

The first lid member 8a is attached to the supporting member 7 by a plurality of first fastening members 9. The first fastening members 9 fasten the second attachment part 82 of the first lid member 8a with the horizontal part 73 of the supporting member 7. Specifically, as illustrated in FIG. 5, the first fastening members 9 each include a bolt 91 and a nut 92. The nuts 92 are fixed to the lower surface of the horizontal part 73 of the supporting member 7. Specifically, the nuts 92 are fixed to the lower surface of the horizontal part 73 by welding and the like.

As illustrated in FIG. 4, the bolts 91 extend to pass through through-holes 821 formed in the second attachment part 82 of the first lid member 8a, and through through-holes 732 formed in the horizontal part 73 of the supporting member 7. The bolts 91 that pass through the through-holes 821 and 732 engage the nuts 92. That is, the bolts 91 are disposed to extend in the vertical direction. The threaded holes of the nuts 92 and the through-holes 732 are aligned to form a line. That is, the threaded holes of the nuts 92 are openings in the vertical direction.

The second lid member 8b is a member for covering the third opening part 72b of the side part 72. The second lid member 8b includes a second body part 81b, a third attachment part 82b, and a second pressing part 83b. The second lid member 8b has the same configuration as the first lid member 8b and thus a detailed explanation will be omitted. The second body part 81b and the first body part 81 have the same configuration, the third attachment part 82b and the second attachment part 82 have the same configuration, and the second pressing part 83b and the first pressing part 83 have the same configuration. The second lid member 8b is attached to the supporting member 7 by a plurality of second fastening members 9b. The second fastening members 9b have the same configuration as the first fastening members 9.

As illustrated in FIG. 2, the upper pipe part 62 that is a portion of the air intake pipe 6 extends upwardly from the horizontal part 73 of the supporting member 7. The upper pipe part 62 is a tubular member and has a diameter larger than that of the lower pipe part 61. The upper pipe part 62 communicates with the lower pipe part 61. The upper pipe part 62 is disposed to encircle the fourth opening part 731 as seen in a plan view. The lower end surface of the upper pipe part 62 is fixed to the upper surface of the horizontal part 73 by, for example, welding and the like. Because the supporting member 7, the lower pipe part 61, and the upper pipe part 62 are fixed to each other, the three components may be handled as one member.

A cap member 19 is attached to the upper end part of the upper pipe part 62. The cap member 19 is a member for preventing the intrusion of rainwater into the air intake pipe 6 from above. The cap member 19 covers an opening of the air intake pipe 6 that extends upward. The cap member 19 includes a plurality of air intake ports 191 that open downwardly. Outdoor air is taken into the air intake pipe 6 through the air intake ports 191.

The wheel loader 1 according to an exemplary embodiment of the present embodiment has the following characteristics.

Because the side part 72 of the supporting member 7 includes the second opening part 72a and the third opening part 72b, the work for coupling the lower pipe part 61 of the air intake pipe 6 and the hose member 5 may be performed through the second opening part 72a and the third opening part 72b. Because the second opening part 72a is covered by the first body part 81 of the first lid member 8a, rainwater may be prevented from intruding into the supporting member 7 via the second opening part 72a. Because the third opening part 72b is covered by the second body part 81b of the second lid member 8b, rainwater may be prevented from intruding into the supporting member 7 via the third opening part 72b.

The first fastening members 9 fasten the horizontal part 73 that extends horizontally to the second attachment part 82 that extends horizontally. Specifically, because the first fastening members 9 are disposed to extend in a perpendicular direction, the surface area occupied by the first fastening members in the second opening part 72a may be reduced. That is, when the first lid member 8a is removed, a reduction in the opening surface area of the second opening part 72a due to the nuts 92 fixed to the supporting member 7 may be suppressed. As a result, the surface area of the second opening part 72a that is used when performing the above coupling work may be increased.

The second fastening members 9b fasten the horizontal part 73 that extends horizontally and the third attachment part 82b that extends horizontally. Specifically, because the second fastening members 9b are disposed to extend in a perpendicular direction, the surface area occupied by the second fastening members 9b in the third opening part 72b may be reduced. That is, when the second lid member 8b is removed, a reduction in the opening surface area of the third opening part 72b due to the nuts 92 fixed to the supporting member 7 may be suppressed. As a result, the surface area of the third opening part 72b that is used when performing the above coupling work may be increased.

Because the first water stop sheet 18b in a compressed state is disposed between the edge of the second opening part 72*a* and the first body part 81, the intrusion of rainwater from a gap between the first body part 81 and the side part 72 may be prevented.

Because the second water stop sheet 18*c* in a compressed state is disposed between the first pressing part 83 and the first attachment part 71, the intrusion of rainwater from a gap between the first pressing part 83 and the first attachment part 71 may be prevented.

While an exemplary embodiment of the present invention has been described above, the present invention is not limited to such embodiment and the following modifications may be made within the scope of the present invention.

While the side part 72 of the supporting member 7 has the two opening parts of the second opening part 72*a* and the third opening part 72*b* in the above embodiment, the number of opening parts is not limited in particular and, for example, the side part 72 may only have one or the other of the opening parts. Moreover, the side part 72 may have three or more openings parts.

While the air intake pipe 6 is configured of the two members that are the lower pipe part 61 and the upper pipe part 62 in the above embodiment, the present invention is not limited as such. For example, the air intake pipe 6 may be configured of only one tubular member.

While an example of a wheel loader applicable to the present invention has been described in the above exemplary embodiment, the work vehicle applicable to the present invention is not limited to the wheel loader. For example, a bulldozer, a hydraulic excavator, or a motor grader and the like may be applied to the present invention.

What is claimed is:

1. A work vehicle comprising:
    an upper plate defining an upper surface of an engine room and having a first opening part;
    an air cleaner disposed in the engine room;
    a hose member coupled to the air cleaner and extending upwardly from the engine room through the first opening part;
    an air intake pipe removably coupled to an upper end part of the hose member;
    a supporting member having a first attachment part, a side part, and a horizontal part, the first attachment part being removably attached to the upper plate to encircle the first opening part as seen in a plan view, the side part extending upwardly from the first attachment part and including a second opening part, the horizontal part extending horizontally from the side part and being fixed to a side surface of the air intake pipe;
    a first lid member having a first body part and a second attachment part, the first body part covering the second opening part, the second attachment part extending horizontally from the first body part and being disposed on the horizontal part of the supporting member; and
    a first fastening member attaching the first lid member to the supporting member by fastening the second attachment part and the horizontal part.

2. The work vehicle according to claim 1, further comprising:
    a first water stop sheet disposed between an edge of the second opening part and the first body part.

3. The work vehicle according to claim 2, wherein:
    the first water stop sheet is compressed by the edge of the second opening part and the first body part when the first lid member is attached to the supporting member.

4. The work vehicle according to claim 1, further comprising:
    a second water stop sheet disposed between the first lid member and the first attachment part.

5. The work vehicle according to claim 4, wherein
    the second water stop sheet is compressed by the first lid member and the first attachment part when the first lid member is attached to the supporting member.

6. The work vehicle according to claim 4, wherein
    the first lid member further includes a first pressing part extending horizontally from a lower end part of the first body part; and
    the second water stop sheet is disposed between the pressing part and the first attachment part.

7. The work vehicle according to 1, wherein
    the side part has a first side plate and a second side plate disposed with a gap therebetween;
    the first opening part is located between the first side plate and the second side plate as seen in a plan view; and
    the second opening part is formed by the gap.

8. The work vehicle according to claim 1, wherein
    the side part has a third opening part facing the second opening part.

9. The work vehicle according to claim 8, further comprising:
    a second lid member having a second body part and a third attachment part, the second body part covering the third opening part, the third attachment part extending horizontally from the second body part and being disposed on the horizontal part; and
    a second fastening member attaching the second lid member to the supporting member by fastening the third attachment part and the horizontal part of the supporting member.

10. The work vehicle according to claim 1, wherein:
    the second attachment part and the horizontal part each have a through-hole;
    the first fastening member includes a bolt and a nut; and
    the bolt extends through the through-holes to engage the nut fixed to the lower surface of the horizontal part of the supporting member.

11. The work vehicle according to any one of claim 1, wherein:
    the air cleaner is suspended from the upper plate.

12. The work vehicle according to claim 1, wherein:
    the air cleaner has an air intake part facing horizontally, and
    the hose member is coupled to the air intake part.

13. A work vehicle according to claim 1, further comprising:
    a band member for fastening, from an outer circumferential side, an upper end part of the hose member disposed on the outer circumferential side of the air intake pipe.

14. The work loader according to claim 1, wherein:
    the air intake pipe has a lower pipe part and an upper pipe part, the lower pipe part being coupled to an upper end part of the hose member, the upper pipe part having a diameter greater than that of the lower pipe part and communicating with the lower pipe part;
    the horizontal part of the supporting member has a fourth opening part;
    an inner circumferential surface of the fourth opening part is connected to an outer circumferential surface of the lower pipe part; and
    the upper pipe part extends upwardly from the horizontal part.

15. The work vehicle according to claim 3, further comprising:
a second water stop sheet disposed between the first lid member and the first attachment part.

16. The work vehicle according to claim 11, wherein:
the air cleaner has an air intake part facing horizontally, and
the hose member is coupled to the air intake part.

17. A work vehicle according to claim 16, further comprising:
a band member for fastening, from an outer circumferential side, an upper end part of the hose member disposed on the outer circumferential side of the air intake pipe.

18. The work loader according to claim 17, wherein:
the air intake pipe has a lower pipe part and an upper pipe part, the lower pipe part being coupled to an upper end part of the hose member, the upper pipe part having a diameter greater than that of the lower pipe part and communicating with the lower pipe part;
the horizontal part of the supporting member has a fourth opening part;
an inner circumferential surface of the fourth opening part is connected to an outer circumferential surface of the lower pipe part; and
the upper pipe part extends upwardly from the horizontal part.

* * * * *